(12) United States Patent
Davis et al.

(10) Patent No.: US 11,368,545 B2
(45) Date of Patent: Jun. 21, 2022

(54) RANKING OF ENTERPRISE DEVICES USING ACTIVITY-BASED NETWORK PROFILES AND FUNCTIONAL CHARACTERIZATION-BASED DEVICE CLUSTERING

(71) Applicant: RSA Security LLC, Bedford, MA (US)

(72) Inventors: Sashka T. Davis, Vienna, VA (US); William E. Hart, Aldie, VA (US)

(73) Assignee: RSA Security LLC, Bedford, MA (US)

( * ) Notice: Subject to any disclaimer, the term of this patent is extended or adjusted under 35 U.S.C. 154(b) by 135 days.

(21) Appl. No.: 16/778,123

(22) Filed: Jan. 31, 2020

(65) Prior Publication Data
US 2021/0243268 A1    Aug. 5, 2021

(51) Int. Cl.
*H04L 67/303* (2022.01)
*H04L 67/50* (2022.01)
*H04L 9/32* (2006.01)
*H04L 43/065* (2022.01)
*H04L 41/0893* (2022.01)

(52) U.S. Cl.
CPC .......... *H04L 67/303* (2013.01); *H04L 9/3236* (2013.01); *H04L 41/0893* (2013.01); *H04L 43/065* (2013.01); *H04L 67/22* (2013.01)

(58) Field of Classification Search
CPC . H04L 67/303; H04L 9/3236; H04L 41/0893; H04L 43/065; H04L 67/22
USPC ........................................................ 709/223
See application file for complete search history.

(56) References Cited

U.S. PATENT DOCUMENTS

| | | | |
|---|---|---|---|
| 9,800,606 B1* | 10/2017 | Yumer | G06F 21/577 |
| 2013/0007236 A1* | 1/2013 | Besehanic | H04N 21/44222 709/223 |
| 2013/0097706 A1* | 4/2013 | Titonis | G06F 21/566 726/24 |
| 2018/0332064 A1* | 11/2018 | Harris | G06F 15/16 |
| 2020/0076846 A1* | 3/2020 | Pandian | H04W 12/088 |

(Continued)

OTHER PUBLICATIONS

Internet Assigned Number Authority (IANA), Jan. 17, 2020.
(Continued)

*Primary Examiner* — Kevin S Mai
(74) *Attorney, Agent, or Firm* — Danielson Legal LLC

(57) ABSTRACT

Techniques are provided for generating activity-based network profiles for devices, and for ranking such devices using the activity-based network profiles. One method comprises evaluating device communications to identify services that communicated with devices of an enterprise; generating an activity-based network profile for each device based on the services that communicated with each respective device; clustering the devices into a plurality of clusters based on a functional characterization of the devices derived from the activity-based network profiles; and ranking the devices within a cluster based on network activity and/or network exposure. The activity-based network profile for a given device: (i) identifies the services that communicated with the given device, (ii) identifies other devices that communicate with a respective service on the given device, and (iii) provides a local fraction metric based on network metrics of the other devices that communicate with the respective service on the given device.

20 Claims, 13 Drawing Sheets

(56) References Cited

U.S. PATENT DOCUMENTS

2020/0120004 A1* 4/2020 Kohout ................ H04L 43/065

OTHER PUBLICATIONS

"Identify Network Hardware and Protocols" downloaded on Jan. 30, 2020.
"How do I Identify the Devices on my Network and Assign Nicknames?", downloaded from https://support.eero.com/hc/en-us/articles/211096103-How-do-I-identify-the-devices-on-my-network-and-assign-nicknames- on Jan. 30, 2020.

* cited by examiner

Category-to-Device Assignment Procedure 400

410: Ignore Services such as:
 ICMP; and
 NTP When Number Client IPs Requesting NTP < T (All Machines Are Time Synchronized and Run NTP Services)

420: If (Device Serves Kerberos, Domain, and LDAP) and (Number of Client IPs for Domain Service > T), then Device is a Domain Controller. (Similar Rules Apply for Generic Active Directory Servers and Those with Access to LDAP Global Catalog).

430: Let S1 be Only Service on Device such that:
 S1's Local Fraction > 50%, and
 Total Client IPs > T,
then Device is Single-Purpose Server of Type S1.

440: Let S2 be Set of Services such that:
 For Each Service in S Local Fraction > 50%, and
 Total Client IPs > T,
then Device is Multi-Purpose Server of Type S2.

450: Let S3 be Set of Services such that:
 (Local Fraction > 30%) and (Total Client IPs > T), and
 Size of Set of Client IPs for Services in S3 >
 50% Total Client IPs,
then Device is Multi-Function Device of Type B.

460: Otherwise, Device has no Functional Characterization and Categorization is Assigned based on Divide and Conquer Clustering.

FIG. 4

Cluster Uncharacterized Devices Process 500

Assign Uncharacterized Devices to One of Four Quadrants (FIG. 5B) Based on Total Number of Exported Services and Total Number of Network Addresses; and Cluster Each Quadrant Separately (FIGS. 5C and 5D).

Process 540 to Cluster Devices in Quadrant 1 (Q1)

Ignore Services such as ICMP and NTP.

Ignore Number of Clients per Service.

Hash Devices Based on Profiles (e.g., by creating hash string that is a sorted concatenation of services exported by device).

Devices that are Singletons and Have No Collisions in Map are Clustered Based on Subnet Address (use Hash Table to Compute Clustering using First Three Octets of IP Address (A.B.C) to Collect Groups of Devices That Might be Managed by Same System Administration Unit). To Validate if Clustering Based on Subnet Address is Valid, Calculate Two Sets and One Metric:

Cluster Centroid: Centroid is a Set of Services that is Intersection of Set of Services Exported by All Devices in Proposed Group;

Cluster Radius: Radius is Union of Set of Services Exported by Device in Group; and Average Jaccard Distance is Used as Measure for Cluster Homogeneity (Add Number of Services That Do Not Belong to Centroid For Each Device and Divide By Size of Cluster);

If Centroid is Empty, Then Cluster Formed by Subnet Address is Ignored.

Cluster Centroids are Computed for Each Cluster (Cluster Centroids Serve as Representation for Group as a Whole; Centroids are Useful to Find Similarity Between New Device and Centroid Quickly, as Opposed to Comparing to Every Device in Cluster Individually).

Process Remaining Devices, Still Not Categorized, as follows:

Compute Set Intersection Between Set of Services That Device Has and Centroids Already Formed and Assign Each Device to Centroid That Has Highest Set Intersection.

FIG. 5C

Process 560 to Cluster Devices in Quadrant 2 or 3 (Q2 or Q3)

Use Same Procedure as FIG. 5C for Clustering Devices Belonging to Quadrants Q2 or Q3. Each Quadrant is Clustered Separately:
1. Hash Devices Based on Their Subnet Addresses, Octet1, Octet2, and Octet 3 of IP Address (Collecting (Chaining) Devices When They Collide to a Set).
2. If Number of Devices Is Large in Each Hash Table Entry Then Group Devices Based on Last Octet Proximity (example ranges: [1-20], [20-100], [101-200], [201-254]).

FIG. 5D

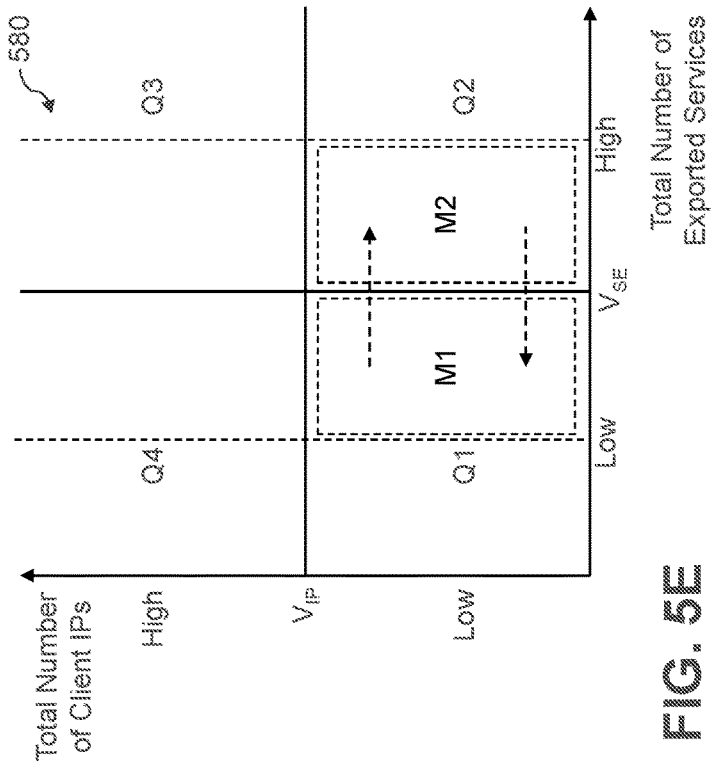

FIG. 5E

Device 10.A1.B1.C1 is an HTTPS Server

Exports 5 Services to 8 Clients
Well-Known Protocols: 4
Reserved Services: 1

External Exposure Protocols: 1

| Protocol/ Service Name | Global Fraction | Local Fraction | Number of Client IPs | Client IPs | External Client IPs | Number Connections by Any Client IP |
|---|---|---|---|---|---|---|
| SNMP | 8.7% | ... | 2 | 10. A2.B2.C2, 10. A3.B3.C3 | | 92500 |
| Microsoft-DS | 0.87% | ... | 2 | 10. A4.B4.C4, 169. A5.B5.C5 | | 3 |
| HTTPS | 2.89% | ... | 5 | 10. A6.B6.C6, ... | | 493 |
| www-HTTP | 0.75% | ... | 1 | 10. A7.B7.C7 | | 1 |
| ICMP (Reserved) | 5.88% | ... | 4 | 10. A8.B8.C8, ... | | 274 |

External Exposure Protocol(s):
Microsoft-DS   Client IPs : (169. A9.B9.C9)
Uses as a Client 4 Services: Domain, HTTPS, NTP, NSP

FIG. 6A

Device 10.A10.B10.C10 is an Active Directory/Global Catalog Server

Exports 8 Services to 47 Clients

Well-Known Protocols: 6
Well-Known Services: 1
Reserved Services: 1

| Protocol/Service Name | Global Fraction | Local Fraction | Number of Client IPs | Client IPs | External Client IPs | Number Connections by Any Client IP |
|---|---|---|---|---|---|---|
| LDAP | 38.83% | | 40 | ... | | 994 |
| Netbios-SSN | 10.0% | | 1 | ... | | 1 |
| Microsoft-DS | 9.09% | | 21 | ... | | 113 |
| NTP | 5.04% | | 6 | ... | | 16 |
| Kerberos | 4.9% | | 5 | | | 268 |
| EPMAP | 10.49% | | 17 | ... | | 122 |
| MSFT-GC | 8.79% | | 8 | ... | | 37 |
| ICMP (Reserved) | 2.94% | | 2 | | | 2 |

Uses as a Client 12 Services

FIG. 6B

| Device 10.A20.B20.C20 is a Client Device |
|---|
| Uses 3 Services from 5 Server Devices<br>Well-Known Protocols: 4<br>Reserved Services: 1 |
| FTP {'10.A21.B21.C21', '10.A22.B22.C22', '10.A23.B23.C23', '10.A24.B24.C24', '10.A25.B25.C25'}<br>SNMP {'10.A31.B31.C31', '10.A32.B32.C32', '10.1A33.B33.C33', '10.A34.B34.C34'}<br>TELNET {'10.A41.B41.C41'} |

RANKING OF ENTERPRISE DEVICES USING ACTIVITY-BASED NETWORK PROFILES AND FUNCTIONAL CHARACTERIZATION-BASED DEVICE CLUSTERING

FIELD

The field relates generally to information processing techniques, and more particularly to evaluation of devices in a network environment.

BACKGROUND

Enterprises typically have devices that export services to their customers, employees, and other users. Information about various enterprise devices, such as purpose, function and ownership of each device, is often maintained in configuration management databases (CMDBs). Ensuring that CMDBs are current is a time-consuming and manual process in dynamic environments where: (i) existing devices are often repurposed, retired, and decommissioned; (ii) devices are often installed and/or reconfigured; (iii) applications running on the devices are often subject to change; and (iv) user access patterns may vary to many applications.

The complexity and the dynamics of most enterprise environments often lead to CMDBs that have inaccurate and/or stale information about the devices. Nonetheless, it is often desirable for security analysts, for example, to: (i) quickly obtain an accurate summary of the activities on each device; and/or (ii) compare how the network activities on one or more devices change over time.

A need exists for techniques for generating activity-based network profiles for devices, and for ranking such devices using the network profiles.

SUMMARY

In one embodiment, a method comprises identifying device communications over at least one network of an enterprise; evaluating the device communications to identify one or more services that communicated with, using the at least one network, a plurality of devices of the enterprise connected to the at least one network; generating an activity-based network profile for each device of the plurality of devices based at least in part on the identified one or more services that communicated with each respective device of the plurality of devices, wherein the activity-based network profile for a given device of the plurality of devices: (i) identifies the one or more services that communicated with the given device for each service that communicated with the given device, (ii) identifies other devices of the plurality of devices that communicate with a respective service on the given device, and (iii) provides a local fraction metric based at least in part on one or more network metrics of the other devices of the plurality of devices that communicate with the respective service on the given device; clustering the devices into a plurality of clusters based at least in part on a functional characterization of the devices derived from the activity-based network profiles; and ranking the devices within one or more clusters based at least in part on one or more of network activity and network exposure.

In some embodiments, the activity-based network profile for the given device further identifies a device type of the given device and wherein the clustering is further based on the device type such that a plurality of devices having one or more of a substantially similar functional characterization and a substantially similar device type are grouped together, wherein the functional characterization assigns the device type to each device.

Other illustrative embodiments include, without limitation, apparatus, systems, methods and computer program products comprising processor-readable storage media.

BRIEF DESCRIPTION OF THE DRAWINGS

FIG. 4 illustrates exemplary pseudo code for a category-to-device assignment procedure, according to one embodiment of the disclosure;

FIGS. 5A, 5C and 5D illustrate exemplary pseudo code for clustering devices that remain uncharacterized by the procedure of FIG. 4, and FIGS. 5B and 5E illustrate associated quadrants used to cluster the uncharacterized devices, according to an embodiment;

FIGS. 6A through 6C illustrate exemplary activity-based network profiles, according to one or more embodiments;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for generating activity-based network profiles for devices, and for ranking such devices using the activity-based network profiles.

In some embodiments, techniques are provided for categorization, clustering, and ranking of enterprise devices using their network profiles. Activity-based profiles for enterprise devices summarize a type and amount of network traffic with respect to different network services that reach and leave a given device, using quantitative information about each service. In one or more embodiments, the activity-based profiles are used to determine a model-free categorization of each device, often without requiring human supervision, such as sets of devices with known categories or labels used to assign a category to each device (e.g., a server category). In some embodiments, human input can be incorporated as well. For example, a given activity-based network profile can be associated with a printer or a phone. If a human user tags the profile as a "printer" then the human label can be transferred to all devices with similar profiles (e.g., those devices that belong to the same cluster).

The activity-based profiles, the characterization, and information about device identifier are used to group devices into clusters of similar devices. Devices are then ranked based on their activity profiles and perceived network exposure risk relative to the cluster to which they belong (and/or a ranking using network activity).

As noted above, one or more embodiments provide techniques for generating activity-based network profiles for enterprise devices, and for ranking such enterprise devices using the activity-based network profiles. In some embodiments, the disclosed device evaluation techniques provide one or more of the following characteristics:

1) passive discovery of enterprise devices;
2) characterization of device functionality based on dynamic traffic measurements and (typically passive) observations;
3) device clustering into sets of functionally and behaviorally similar clusters, using the device activity-based profiles and characterization; and
4) device rankings based on the activity and/or network risk.

Figure 1:
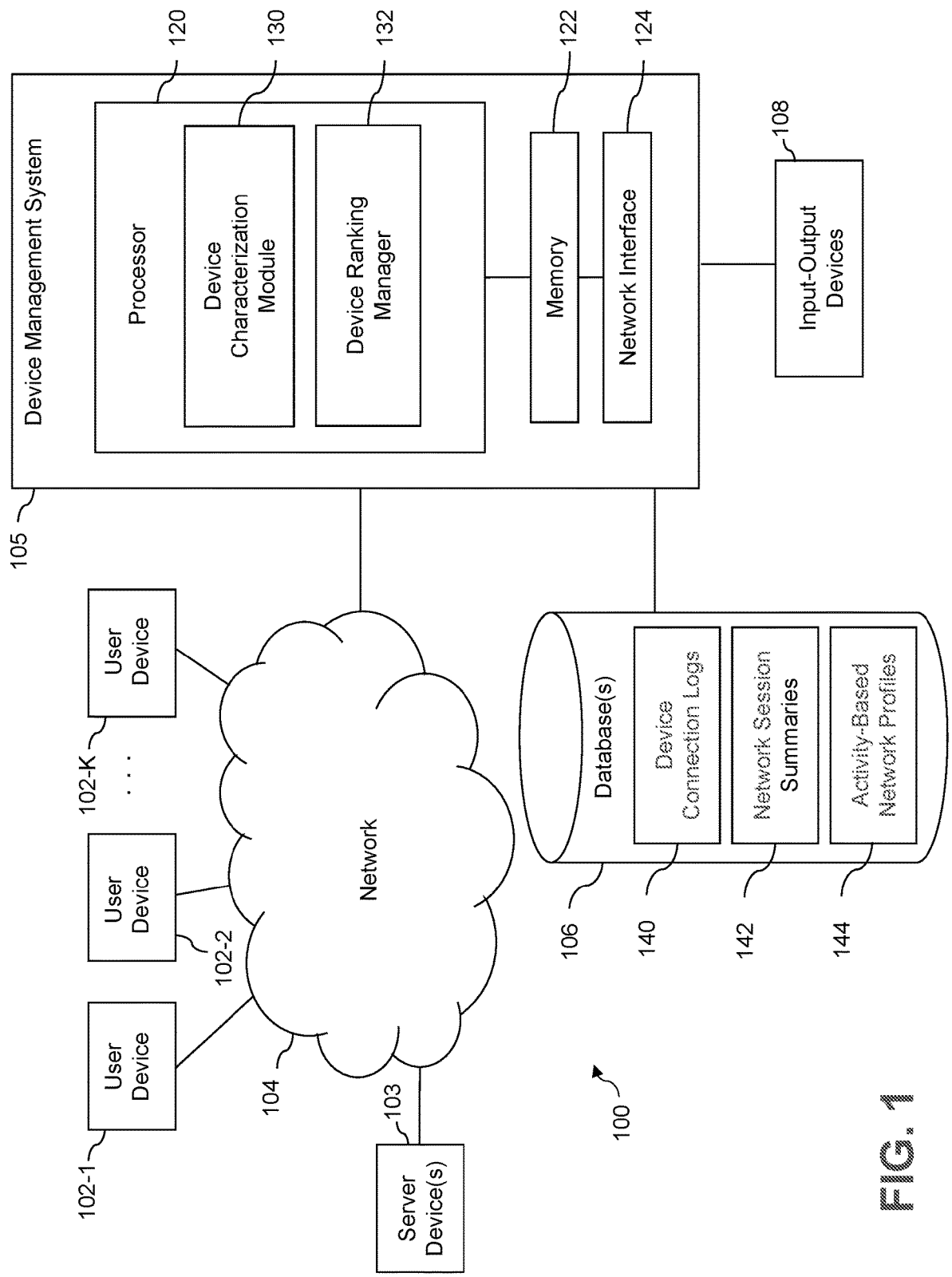
FIG. 1 shows a computer network configured in accordance with an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-K, collectively referred to herein as user devices 102. The computer network 100 further comprises one or more server devices 103. The user devices 102 and server devices 103 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is a device management system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the device management system 105 can have an associated database 106 configured to store data pertaining to device management information, which comprise, for example, device (and/or network) connection logs 140, network session summaries 142 and the activity-based network profiles 144. In other embodiments, the device management information may also comprise network traffic captures; application logs; endpoint agent data and/or logs (in embodiments that employ active collection as opposed to passive collection); and/or virtual private cloud logs (e.g., for a cloud deployment) (not shown in FIG. 1).

The database 106 in the present embodiment is implemented using one or more storage systems associated with device management system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with device management system 105 are input-output devices 108, which illustratively comprise keyboards, displays or other types of input-output devices in any combination. Such input-output devices can be used, for example, to support one or more user interfaces to the device management system 105, as well as to support communication between user devices 102, the device management system 105 and other related systems and devices not explicitly shown.

The device management system 105 in the FIG. 1 embodiment is assumed to be implemented using at least one processing device. Each such processing device generally comprises at least one processor and an associated memory, and implements one or more functional modules for controlling certain features of the device management system 105.

More particularly, the device management system 105 in this embodiment can comprise a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

In at least one example embodiment, the server devices 103 may correspond to a data server (such as a ScaleIO™ data server, for example), and the user devices 102 may each correspond to a data client (such as a ScaleIO™ data client, for example).

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the device management system 105 to communicate over the network 104 with the user devices 102 and/or server devices 103, and illustratively comprises one or more conventional transceivers.

The processor 120 further comprises a device characterization module 130 and a device ranking manager 132. It is to be appreciated that this particular arrangement of modules 130 and 132 illustrated in the processor 120 of the FIG. 1 embodiment is presented by way of example only, and alternative arrangements can be used in other embodiments. For example, the functionality associated with the modules 130 and 132 in other embodiments can be combined into a single module, or separated across a larger number of modules. As another example, multiple distinct processors can be used to implement different ones of the modules 130 and 132 or portions thereof. At least portions of the device characterization module 130 and the device ranking manager 132 may be implemented at least in part in the form of software that is stored in memory 122 and executed by processor 120.

It is to be understood that the particular set of elements shown in FIG. 1 for generating network profiles for enterprise devices, and for ranking such enterprise devices using the network profiles, involving device management system 105 and user devices 102 and server devices 103 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing the device characterization module 130 and the device ranking manager 132 of the device management system 105 in computer network 100 will be described in more detail with reference to, for example, the flow diagram of FIG. 3.

Figure 2:
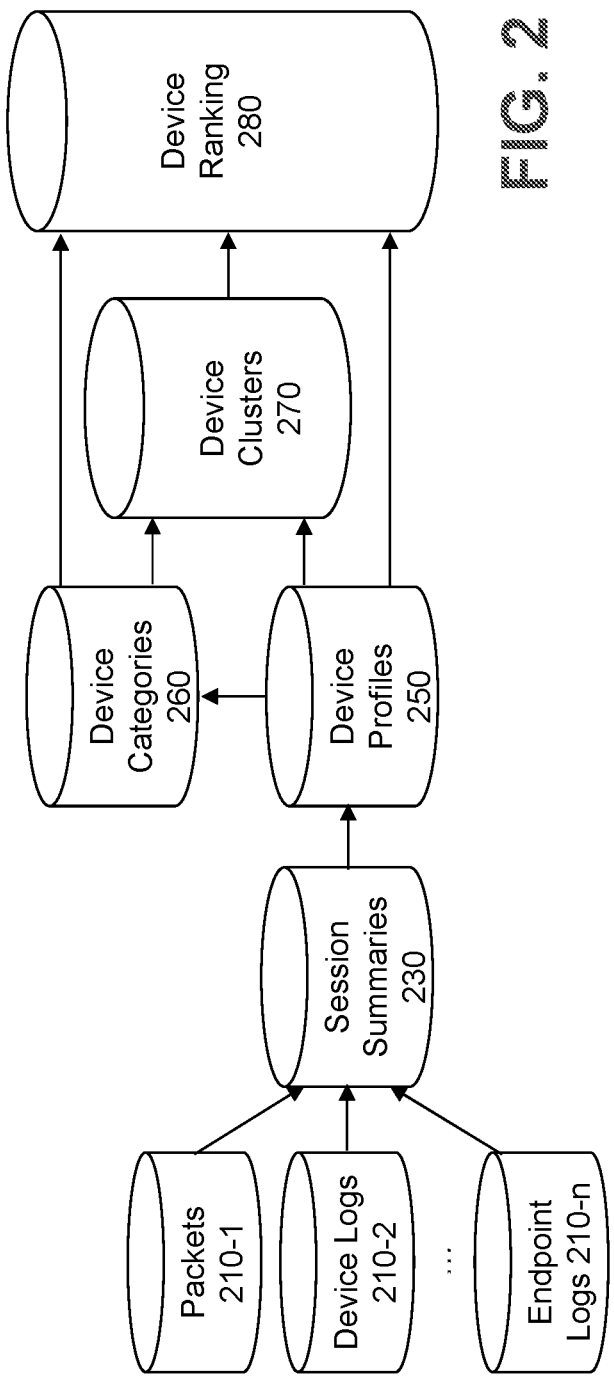
FIG. 2 illustrates a number of exemplary data sources that can be analyzed to generate the activity-based network profiles of FIG. 1, according to some embodiments.

FIG. 2 illustrates a number of exemplary data sources 210-1 through 210-n that can be analyzed to generate the activity-based network profiles 144 of FIG. 1, according to some embodiments. As shown in FIG. 2, the exemplary data sources 210 comprise packets 210-1, device logs 210-2 and endpoint logs 210-n. In this manner, in some embodiments, communications among devices 102, 103 are identified by processing network traffic on the network 104 and/or log entries for network devices 102, 103 of the network 104. The network traffic may be obtained, for example, from traffic capture data sources and network sessions (e.g., from NetFlow logs generated by the RSA NetWitness® Platform, commercially available from RSA Security LLC of Hopkinton, Mass.). In some embodiments, the exemplary NetFlow logs typically comprise one or more of the following representative fields:

source IP address, source port number, client data, client packet count, destination IP address, destination port number, server data, server packet count, time, and transport protocol identifier.

For example, a five-tuple session description can be obtained from the source and destination IP addresses; source port and destination port numbers, and transport protocol identifier. In other embodiments, the packet counts, session size, and duration from the exemplary NetFlow logs can also be used for additional statistical modeling. The metadata from the exemplary NetFlow logs (e.g., port numbers and transport protocol numbers extracted from the IP header) may be processed to obtain human readable service names, standard registration information can be employed from the Internet Assigned Number Authority (IANA). Representative IANA data typically comprises the port number, the transport protocol, the abbreviated service name and the full service description. See, for example, IANA Service Name and Transport Protocol Port Number Registry (which comprises, for each service, an assigned port number, relevant transport protocol, the service abbreviated name and the full service description); IANA Assigned Internet Protocol Numbers (which comprises, for each protocol, the assigned decimal, the protocol abbreviated name and the full protocol description). Network Services may include, for example, SMTP (Simple Mail Transfer Protocol), SNMP (Simple Network Management Protocol), FTP (File Transfer Protocol), LDAP (Lightweight Directory Access Protocol, and DNS (Domain Name System))

Likewise, the log entries that may be processed may be obtained, for example, from user devices 102, server devices 103 and other endpoint devices (for example, as collected by endpoint agents), application logs (such as collections of HTTPS traffic) and/or virtual private cloud logs.

In one or more embodiments, network traffic and/or device logs can be obtained from a threat detection and response system, such as the RSA NetWitness® Platform, referenced above. Generally, network traffic captured inside an enterprise network 104 or NetFlow logs generated by the threat detection and response system and collected, for example, from internal routers on the enterprise network 104 that provide rich information about the services that communicate with each device via the network 104 and that generate observable network traffic. It is noted that similar data might be available from endpoint application logs (however, the actual network traffic (and NetFlow from routers) is often considered the most credible source of data from a security standpoint).

In the event that repetitive or otherwise redundant information regarding device communications is collected, data deduplication techniques can be employed to remove the redundant information (for example, based on timestamps of each device communication can be analyzed to identify repeated device communications). For example, multiple routers in the network 104 can collect data regarding the same device communication.

Traffic information that is analyzed can be collected over a period of time, such as one day as a measurement window.

The exemplary data sources 210 are processed to generate session summaries 230 (e.g., comprising the network session summaries 142 of FIG. 1). The session summaries 230 are processed to generate device profiles 250 (e.g., the activity-based network profiles 144 of FIG. 1). As discussed further below, the device profiles 250 are processed to classify the devices 102, 103 into device categories 260. The device profiles 250 and the assigned device categories 260 are used to assign each of the devices 102, 103 into a device cluster 270. One or more of the device profiles 250, device categories 260 and device clusters 270 are employed to generate one or more device rankings 280, as discussed further below, for example, in conjunction with FIG. 3.

Figure 3:
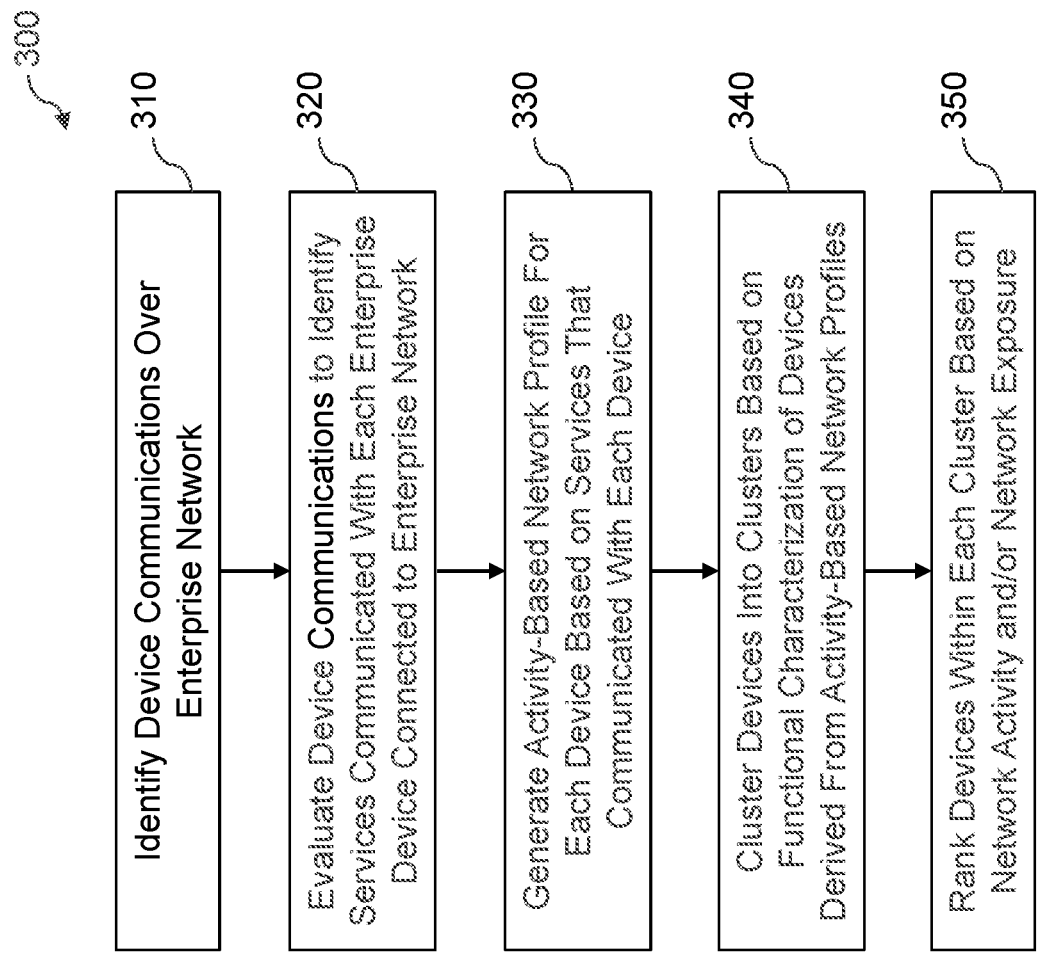
FIG. 3 is a flow chart illustrating an exemplary implementation of a process for generating network profiles for enterprise devices, and for ranking such enterprise devices using the network profiles, according to one or more embodiments of the disclosure.

FIG. 3 is a flow chart illustrating an exemplary implementation of a process 300 for generating network profiles for enterprise devices, and for ranking such enterprise devices using the network profiles, according to one or more embodiments of the disclosure. As shown in FIG. 3, device communications (e.g., device connections) over the network 104 of an enterprise are identified during step 310, for example, using the representative data sources 210, as discussed above in conjunction with FIG. 2.

The device communications are then evaluated during step 320 to identify services that communicated with, using the at least one network, a plurality of devices of the enterprise connected to the at least one network. An activity-based network profile (e.g., device profile 250) for each of the identified devices is generated during step 330, for example, based on the identified services that communicated with each respective device. As discussed further below in conjunction with FIGS. 6A through 6C, in some embodiments, the activity-based network profile for a given device (i) identifies the one or more services that communicated with the given device for each service that communicated with the given device, (ii) identifies other devices that communicate with a respective service on the given device, and (iii) provides a local fraction metric, discussed further below in conjunction with FIG. 4, based at least in part on one or more network metrics of the other devices that communicate with the respective service on the given device.

In some embodiments, a local fraction metric for client devices may be based on, for example, a ratio of one or more network metrics of communications of the given device with the respective service accessed by the given device to the one or more network metrics of communications with any service accessed by the given device. In one or more embodiments, the local fraction metric for client devices may be based on one or more of the following ratios:

combined amount of traffic (e.g., number of bytes and/or number of packets) for a given service relative to the total amount of traffic emanating from the device;

combined amount of uploaded (or downloaded) traffic (e.g., number of bytes and/or number of packets) for a given service relative to the total amount of uploaded (or downloaded) traffic emanating from the device; and a number of connections for a particular service relative to a total number of connections for all services.

In further variations for client devices (and potentially other types of devices), the duration (e.g., the amount of time a given connection lasts) can be considered as additional network measurements for each service. Thus, another potential definition for obtaining the Local Fraction may be expressed, as follows:

the combined duration of all connections for a given service relative to the total duration of all connections.

During step 340, the devices are clustered into a plurality of clusters based on a functional characterization (e.g., a device type and/or a device category) of the devices derived from the activity-based network profiles. A functional categorization (label or classification) can be assigned, for example, based on the local fraction amounts for different services and a threshold value for the minimum number, T, of IP addresses that contact a device. In some embodiments, at least T distinct client IP addresses need to connect to the device to ensure that the device is as a server (e.g., the threshold T removes noise in the data due to accidental connections (such as network scanners). Representative values of T may include five and 10. One exemplary functional categorization assigns a category to each device that reflects usage of the device by users.

In at least some embodiments, devices that do not demonstrate a functional characterization may be assigned to a cluster using a divide and conquer clustering algorithm, as discussed further below, to form groupings based on one or more of a profile-similarity, a network proximity, and a device address proximity. For example, the divide and conquer clustering algorithm can evaluate, for a given device, a set of services that communicated with the given device, a total number of network addresses that communicated with the given device and/or a network address of the given device.

In other embodiments, it may be desirable to have a cluster of undefined devices and the cluster is purposely retained as a cluster of "undefined" devices, rather than employing the divide and conquer clustering algorithm.

During step 350, the devices are ranked within each cluster based at least in part on one or more of network activity and network exposure. For each cluster of devices, two different orderings of the devices that belong to a given cluster are determined, such as a usage or activity ranking, and a (network) risk ranking, in some embodiments. In this manner, Domain Controllers (DC) are compared to other DCs and HTTP servers are compared to HTTP servers, for example. The exemplary ranking of devices is thus relative to the cluster of devices that each device belongs to. In one or more embodiments, the usage ranking orders all devices in a given cluster based on the number of distinct IP addresses that access only those services that define the main function of the cluster. For example, in one implementation, the cluster of all DOMAIN servers contained 10 devices, and the centroid of the cluster is the DOMAIN service. The usage ranking will order devices based on the number of IP addresses that have requested each domain service in the DOMAIN cluster.

Likewise, the risk ranking, in some embodiments, is a function on: (1) a total number of services exported; (2) a number of external IP addresses that access the device; and (3) the total number of IP addresses that access the server. The intuition behind the network risk ranking is that the risk increases as each of these three factors (1), (2), and (3) grow. The product of the three factors is computed to order devices from high to low, in one exemplary embodiment.

In some embodiments, an exposure or risk ranking of devices can be generated that is global for all devices. In other words, the global ranking in such embodiments will not be relative to the devices in a given cluster. Exposure is a function of network measurements that can be interpreted as cluster independent attributes. For devices that export services, the following representative attributes may be employed:

number of services exported;
number of distinct IPs that reach the device; and
number of external client IP addresses.

In addition, the ranking can be a total order, a partial order or a normalized score that is a function of the above representative attributes.

If there is more than one service in the centroid, then the product of the number of IP addresses for each service that defines the device is used (e.g., when there are multi-purpose devices). Devices are ordered based on the product of the number of distinct IP addresses accessing each device for each service.

FIG. 4 illustrates exemplary pseudo code for a category-to-device assignment procedure 400, according to one embodiment of the disclosure. As shown in FIG. 4, the exemplary procedure 400 initially specifies during step 410 that one or more services are ignored, for example, to remove from consideration common services that are not indicators for functionality, such as ICMP (Internet Control Message Protocol), and NTP (Network Time Protocol), when the number of client IP addresses requesting NTP is below the threshold, T.

Step 420 specifies a rule for classifying domain controllers that identifies different types of active directory servers that run on average Kerberos, LDAP and a set of other services such as DOMAIN, MSFG-GC. Step 430 specifies a rule for classifying single-purpose servers (e.g., a single-purpose server with a well-defined functionality), where the local fraction metric is based on a ratio of network metrics of other devices that accessed the respective accessed service to the network metrics of devices that accessed any service on the respective device.

Steps 440 and 450 specify rules for classifying multi-purpose servers (e.g., a multi-purpose server with well-defined functionality) and multi-function devices, respectively. The multi-function device rule of step 450 applies when the there are no services that each serve a clear majority of the clients. Thus, step 450 looks for a combination of services that can give a label/characterization of a device (for example, seeking two or more services whose combined set of clients exceeds 60%, yet individually the number of client IP addresses is smaller than 50% of all clients but not insignificant; and each service has a local fraction at least 30% to contribute).

In an exemplary implementation, about 90% of the devices were found to have an identifiable functional categorization using the procedure 400. The total number of functional categories (labels or classes) was around 90. Some representative categories include single-purpose servers, such as an SNMP server; and multi-purpose servers, such as a Microsoft-DS and EndPoint Mapper server.

Step 460 applies when a device has no functional characterization and the categorization is assigned based on a divide and conquer clustering approach, as discussed further below in conjunction with FIG. 5A.

The approach of procedure 400 is unsupervised and does not require a model for how a device should behave and what profile the device should have. The services that the device exports are inspected and the load on each service to assign a category for each device is evaluated. If human supervision is available, then the human knowledge can be incorporated into the disclosed system (all devices that have similar or exact profile are grouped as the "known" device profile and the labeling is transferred to other devices).

Clustering Uncharacterized Devices (Step 460)

Following execution of the procedure 400 of FIG. 4, the remaining devices will have activity profiles that do not have a dominant service (with respect to IP addresses that request the service from the device). Moreover, all services in the profiles of each device will be accessed by at most some defined fraction of the Total Number of Client IP addresses (the exemplary embodiment of FIG. 4 uses 30%). One heuristic approach is to ignore the actual number of IP addresses that have requested each service and to consider only the set of services requested (e.g., SMTP, FTP, and MONGO-DB database program); the total number of IP addresses that connect to the device as a whole; and the device IP address as parameters to an algorithm that groups devices into similar clusters. In some embodiments, a divide and conquer approach is employed, where the input to the algorithm is initially partitioned (divide step) into two or more groups, and then potentially different algorithm are applied to each partition separately and independently of the other partitions. Examples of divide and conquer algorithms include: binary search; quick sort, merge sort, fast integer and matrix multiplication algorithms.

Figures 5A, 5B:
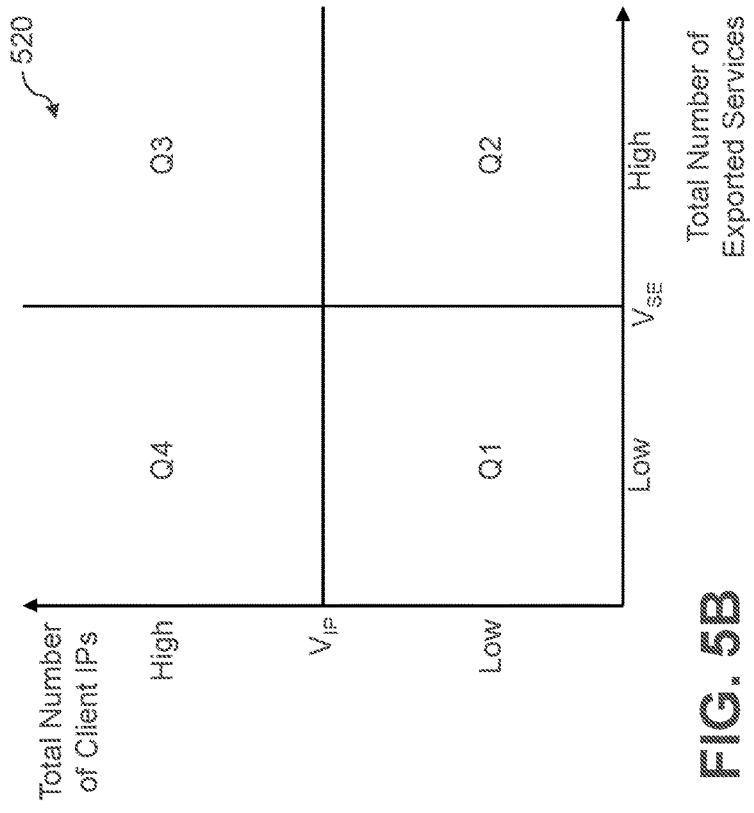

FIG. 5A illustrates exemplary pseudo code for a cluster uncharacterized devices procedure 500, according to an embodiment (based on the set of devices that have no services that indicate a majority of client IP addresses and therefore no identifiable function can be identified, according to step 460 of FIG. 4). As shown in FIG. 5A, the exemplary cluster uncharacterized devices procedure 500 initially assigns uncharacterized devices to one of four quadrants (e.g., buckets), discussed further below in conjunction with FIG. 5B, based on a total number of exported services and a total number of network addresses. Each quadrant is then clustered separately, as discussed further below in conjunction with FIGS. 5C and 5D.

The exemplary cluster uncharacterized devices procedure 500 places devices in one of four quadrants based on the total number of services that the devices export and the total number of client IP addresses, as shown in FIG. 5B. FIG. 5B illustrates an exemplary assignment of devices 520 to one of four quadrants by the cluster uncharacterized devices procedure 500 of FIG. 5A, according to some embodiments of the disclosure. In FIG. 5B, $V_{IP}$ is a threshold that separates the uncharacterized devices based on a total number of client IP addresses into two sets, Q1/Q2 and Q4/Q3, corresponding to low and high number of clients, respectively. Similarly, $V_{SE}$ is a threshold that separates the uncharacterized devices based on a total number of services exported into two sets, Q4/Q1 and Q3/Q2, corresponding to low and high number of exported services, respectively. It is noted that quadrant four (Q4) should generally be empty because devices with a high number of clients and a lesser number of services will have one or two services that will have sufficiently many IP addresses and will fall into the categories of rules 430, 440, or 450 (e.g., under a pigeonhole principle). The exemplary procedure 500 finally clusters each quadrant Q1-Q4 (or bucket) separately.

FIG. 5C illustrates exemplary pseudo code for a process 540 to cluster devices in the first quadrant (Q1) of FIG. 5B, according to at least one embodiment of the disclosure. As shown in FIG. 5C, the exemplary process 540 initially specifies that one or more services are ignored, for example, to remove from consideration common services that are not indicators for functionality, such as ICMP, and NTP, when the number of client IP addresses requesting NTP is below the threshold, T (in a similar manner as the procedure 400 of FIG. 4).

Generally, the exemplary process 540 assigns devices that do not demonstrate a functional characterization to a cluster using the exemplary divide and conquer clustering algorithm, to form groupings based on one or more of a profile-similarity, a network proximity, and a device address proximity. For example, the divide and conquer clustering algorithm can evaluate, for a given device, a set of services that communicated with the given device, a total number of network addresses that communicated with the given device and/or a network address of the given device.

FIG. 5D illustrates exemplary pseudo code for a process 560 to cluster devices in the second or third quadrants (Q2 or Q3) of FIG. 5B, according to some embodiments. As shown in FIG. 5D, the exemplary process 560 uses a same (or substantially similar) procedure for clustering devices belonging to quadrants Q2 or Q3 as the process 540 of FIG. 5C, where each quadrant is clustered separately.

In one or more embodiments, the remaining devices that are not placed in a group/cluster by the procedures 500, 540, 560 of FIGS. 5A, 5C and 5D form singleton clusters (as they appear to have largely non-overlapping activity-based profiles and or unique network addresses).

FIG. 5E illustrates an exemplary determination 580 of the thresholds $V_{IP}$ and $V_{SE}$ of FIG. 5B, according to one or more embodiments of the disclosure. In some implementations, a gap between high and low numbers of client IP addresses and number of exported services was quite large. In one evaluated dataset, all but four devices exported fewer than 20 services and four devices exported more than 40 services. Thus, the gaps between low and high values was substantial. In the unlikely event that there is no "substantial" gap, and the total number of client IP addresses and/or the total number of services exported by devices in the enterprise are uniformly distributed in the range, the following procedure can be employed, as shown in FIG. 5E, to determine the threshold $V_{SE}$. Each quadrant Q1 and Q2 is further subdivided in the middle of the range. All the devices from quadrant Q1 that also belong to the range M1 will be added as members to quadrant Q2 (and will remain in quadrant Q1). All the devices from quadrant Q2 that belong to the range M2 will be added as members to quadrant Q1. As a result, devices in ranges M1 and M2 will appear in two quadrants (because there are devices on each side that they could be similar to, with respect to the number of services). The usual clustering/categorization is then applied for each updated quadrant separately. Note that devices that belong to the range M1, based on the services that they export, can be similar either to (i) other devices in their group (M1), (ii) the remaining member of the quadrant portion, Q1-M1, or (iii) the members of the adjacent quadrant that belong to the range M2. A similar process is then applied, if needed, to determine the threshold VIP.

Activity-Based Network Profiles

As noted above, activity-based profiles for enterprise devices summarize a type and amount of network traffic with respect to different network services that communicate with a given device, using quantitative information about each service. In one or more embodiments, the activity-based profiles are used to determine a model-free categorization of each device.

In some embodiments, a device is identified using an IP address. Even though laptops, desktops and mobile devices may obtain their IP addresses from DHCP (Dynamic Host Configuration Protocol) servers and lease them for some small or undetermined period of time, infrastructure and major devices typically do not change their IP addresses often in on-premise deployments. From the session meta data the activity-based profile can be computed.

In one or more embodiments, for each service exported by a given device, the total number of distinct client IP addresses that have requested the service is counted. In addition, one or more embodiments monitor the set of all IP addresses that have requested service from the given device. For each service in the activity-based network profiles 144, two ratios are compute, a local fraction and a global fraction, denoted as Loc.Frac and Glob.Frac, respectively. For each service, the local fraction is a ratio of the number of distinct client IP addresses that requested the service in question, to the total number of IP addresses requesting any service from the device. Generally, in some embodiments, the local fraction indicates how important a service is for the functionality of the device (and is used to determine the functional categorization).

The global fraction is the ratio of the number of distinct IP addresses that have requested the service to the total number of IP addresses that have requested that particular service from any device in the enterprise. Generally, in one or more embodiments, the global fraction intuitively measures how "popular" the device is as a server (for example) from among all other servers that offer the same service in an enterprise (and is used, for example, for activity-based device rankings). In some exemplary embodiments, services are grouped into three categories to ease visual inspection: well-known-protocols, (e.g., TCP/UDP (transmission control protocol/user datagram protocol) transport protocols and ports below port 1023). Well-known-services (e.g., TCP/UDP transport and ports in the range 1024-10000). The remaining services are classified as "reserved."

Consider a device that exports three services, such that the distinct number of IP addresses reaching each service are 30, 30, and 30. Note that the local fraction values in this scenario can vary from 30% (where there is no intersection of the sets of client IP addresses that access the three different services) to 100% (the same set of IP addresses access all three services) based on the count of the total number of distinct IP addresses that access the device as a whole.

FIGS. 6A and 6B illustrate exemplary activity-based network profiles 600, 650 for an HTTPS server and an active directory/global catalog server, respectively, according to one embodiment. The exemplary activity-based profiles 600, 650 list, for each service, the IP addresses that connect to the device, and the local and the global fractions (Loc.Fac and Glob.Frac). Also, in some embodiments, whether the IP addresses are internal or external to the enterprise are considered as well (e.g., as the number of IP addresses that access the device are used to rank devices based on their risk (see, Ranking of Devices, below).

In one or more embodiments, the exemplary activity-based network profiles 600, 650 maintain a category for each device, indicating a functional label assigned, for example, using unsupervised learning techniques. The category may depend on the number of distinct client IP addresses for each service. The category is often a service or a set of services that are requested by the majority of the client IP addresses requesting service from the device.

In addition, in some embodiments, the exemplary activity-based network profiles 600, 650 may also maintain a type for each device. In one exemplary implementation, there are six different device types:

server (e.g., a device that serves at least K distinct IP addresses, such as K=5);

client (e.g., a device that does not serve any other device but requests services from other devices);

few clients—a low load device that exports one or few services to a very small number of IP addresses (e.g., fewer than K devices are requesting service from the low load device);

MSMC (many services, many clients)—a device that exports a large number of services to a large number of clients (for example, the device might be a virtual machine; a separate category is used in this embodiment, distinct from the server category because no reasonable functional label or category can be assigned); and MSFC (many services, few clients)—a device that exports a large number of services (e.g., hundreds of services) to a small number (e.g., tens) of clients.

For each service, in some embodiments, the exemplary activity-based network profiles 600, 650 maintain:

name (e.g., snmp, or http);
global fraction;
local fraction;
number of Client IP addresses (CIPs);
actual client IP addresses;
external client IP addresses; and
ConnTotal (e.g., the total number of connections made by any Client IP address (CIP).

Some embodiments thus use the knowledge of internal IP address prefixes of an organization to distinguish between devices owned by the enterprise (referred to as internal devices), in addition to the non-routable IP space (e.g., IP addresses 10.x, 192.168.x, 172.16-31.x). The IP address prefixes can be used to discriminate between internal and external IP addresses.

FIG. 6C illustrates an exemplary activity-based network profile 680 for a representative client device, according to one embodiment. In some embodiments, devices are categorized as a client because they do not export a service, and rather request services from other devices. The exemplary activity-based network profile 680 for a representative client device is represented with a modified version of the server activity-based network profiles of FIGS. 6A and 6B.

Processing of Highly Dimensional and Extremely Sparse Vectors

As noted above, enterprise devices 102, 103 are categorized, clustered, and ranked in one or more embodiments using their activity-based network profiles (e.g., FIGS. 6A and 6B). In some embodiments, the activity-based network profiles 144 are generated by associating a numeric feature vector with each device 102, 103 that represents quantitative information about the services the device exports (and imports). It has been found that there are more than 12,000 services registered with IANA, therefore one component of the feature vector can be allocated to each service (in any fixed order) to obtain a 12,000-dimensional feature vector representing the network activity profile of the device. Each component could be assigned, for example, the number of distinct IP addresses that have contacted the device; or the number of connections made to the device for each service. It has been found that this is a highly dimension space and enterprises could have many thousands of devices.

It is noted that the feature vectors (e.g., related to the activity-based network profiles 144) are sparse. Some devices export one service (only one non-zero component, with the other components being 0). Therefore, the Hamming weight of such vector for exporting only one service is one. Meanwhile, other devices export tens of services (it was observed that very few devices in at least one evaluated implementation exported over one hundred services). For example, devices whose feature vectors exceed the Hamming weight of 200 were not observed. Thus, the evaluated data is highly dimensional and at the same time extremely sparse (where all observed Hamming weights were less than 200, and the average weight was in the single digits).

As noted above, the activity-based profiles are used in some embodiments to determine a model-free categorization of each device by assigning a category to each device that indicates the functionality of the corresponding device and usage based on traffic. Devices are then grouped based on common functionality and ranked based on their activity and risk.

In such cases with high dimension and extreme sparsity, the dimensions of the feature vectors are in the thousands (corresponding to the number of existing applications), yet the Hamming weight of the feature vectors representing devices is extremely low. In some embodiments, the applications of most interest are those applications having a majority of the network traffic with a given device (relative to other applications). The exemplary embodiments aim to reduce the high dimensionality by identifying those feature components whose combined weight is more than most of the rest of the feature components (e.g., a majority of the feature components) in order to separate a small number of important features from a large set of features. The devices are then compared based on the remaining components.

Figure 7:
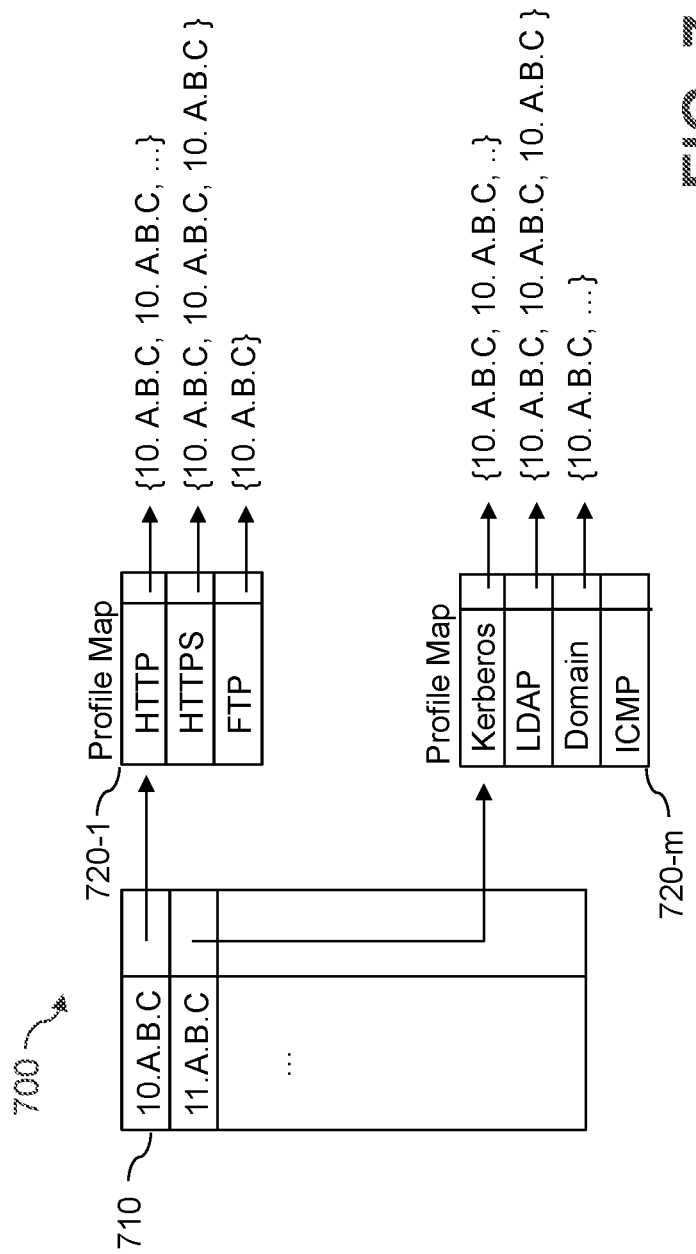
FIG. 7 illustrates an exemplary data structure for storing device information and profile information, according to some embodiments of the disclosure.

FIG. 7 illustrates an exemplary data structure 700 for storing device information and profile information, according to some embodiments of the disclosure. A first master key-value map 710 holds device identifiers (such as IP addresses) and the value for each key points to another hash table 720-1 through 720-$m$ that holds a profile map for the corresponding device. The identified profile map for a given device is keyed by each service served by the given device and the value is the set of client IP addresses that have requested the service. In the example of FIG. 7, device 10.A.B.C serves three services {http, https, ftp}.

Observations

In some embodiments, the generation of the activity-based network profiles 144 is (nearly) linear time in the size of the data. One pass of the input data is performed and then a hash function is applied to each internal IP address. The services that the device exports are then stored in the corresponding profile map 720, and for each service, the sets of IP addresses of the clients for this service are stored in the corresponding profile map 720. Set data structures are usually implemented as a balanced search trees (BST) and the operations on BSTs are logarithmic in their size. The sets of IP addresses for each service, for each device, however, are many orders of magnitude smaller than the size of the input dataset.

The functional categorization was also found to be linear time, in at least some embodiments, in the number of internal devices (e.g., servers) that export services. In implementations that categorize only enterprise devices with fixed IP addresses (e.g., servers), all IP addresses that are only clients do not need to be categorized and can optionally be removed from consideration in a separate hash table. The functional clusters are based on the assigned functional category of each device.

As discussed above in conjunction with FIGS. 5A through 5E, the remaining devices are clustered with a divide and conquer strategy by hashing either IP prefixes or short profiles to hash tables. In some exemplary implementations of the disclosed techniques for generating network profiles for enterprise devices, and for ranking such enterprise devices using the network profiles, the sizes of the buckets in quartiles Q1, Q2, and Q3 of FIG. 5B were smaller than 250, while the total number of potential devices reviewed were greater than 7000.

Clustering can be used to categorize new devices by initially comparing activity-based network profiles 144 with the centroid of each cluster, and then with the members of the cluster in which a given new device has the most overlap.

Suppose an analyst has a given device of interest and wants to find all other devices in an enterprise that are similar to the given device. A trivial and expensive approach could first compute the activity-based profile of the device and then compare the activity-based profile of the device to the profiles of all other devices in the enterprise. Computing "similarity" between a first profile against all profiles may be considered computationally expensive. Instead, the centroids of all clusters that have been computed can be used in some embodiments. The profile of the given device of interest is compared to only the centroids of the existing clusters. A set of centroids are identified that overlap with the profile of the given device and then, if needed, the given device can be compared against all devices that are members of the corresponding clusters. In this manner, only devices that have overlap in profiles are identified, as opposed to all profiles, providing a reduction of data and a reduced computational cost. The number of clusters in some exemplary implementations (e.g., 90) are many orders of magnitude smaller than the number of devices (e.g., 8,000) in a representative enterprise, making the cost of the computation sublinear in the size of the data. Cluster centroids serve as a representative succinct profile of all devices in the corresponding cluster.

Protocol Fingerprinting and Encrypted Application Fingerprinting

Some exemplary embodiments employ the protocol number obtained from the IP header and the destination port to identify a given application using the IANA data. However, this approach may be inaccurate when customers deploy services using non-standard ports. The protocol meta key can be leveraged to identify well-known protocols (e.g. SMTP and FTP) and many applications based on an analysis of the entire network session, thereby leveraging capabilities of the NetWitness® platform, for example.

In addition, the network ports can be used in some embodiments for determining the services that are running on the devices. One or more embodiments, however, recognize that ports can be altered from the default values related to known protocols. Thus, some embodiments use NetWitness® content parsers that are port-agnostic to more accurately determine the actual services based on multiple elements of the observed network communications. For example, some embodiments assume that any traffic observed on port 80 is associated with HTTP traffic since port 80 is the default port. However, some embodiments recognize that a port number can be altered on a web server, for example, and other applications or services can be modified to transmit on that port. Thus, one or more embodiments use a combination of information (e.g., tokens in header and payloads) to identify the associated service, which has been found to be more accurate in some implementations.

Encrypted applications that leverage Transport Layer Security (TLS) may create a different problem. Although the traffic inside the TLS tunnel typically cannot be accessed, JA3 and JA3S signatures can be used in some embodiments to develop a catalog of the internal applications. JA3 is an open source mechanism for fingerprinting SSL/TLS connections, created by Salesforce. According to Salesforce, the JA3 name refers to the initials of the three individual creators. A JA3 and JA3S signature catalog can be built for all internal applications of an enterprise and their corresponding identity. A hashing mechanism can be employed in some embodiments that computes and stores JA3 and JA3S fingerprints of all internal host devices and uses the signature for identifying the application when traffic is encountered.

Thus, when a majority of the network traffic is encrypted, there are options to decrypt the encrypted traffic natively on the NetWitness® platform or to receive the cleartext traffic from supported third party decryption products. In further variations, a JA3 and JA3S fingerprint library mapping can be used that maps JA3 and JA3S fingerprints to applications, and then correlates those fingerprints to the SSL connections between devices, which can be used to help determine what client or server services/applications reside on the devices. Alternatively, further details can be obtained directly from any systems that has a NetWitness® endpoint agent installed.

In further variations, MAC (media access control) addresses and host names can be used to identify devices, as the disclosed techniques for clustering, categorization, and characterization of devices is independent of how a given device is identified. In addition, while the exemplary approaches described above for clustering and categorization of devices are unsupervised, if a set of labeled devices are available, they can be used as training seeds or centroids of clusters and other devices similar to the labeled set can be identified by comparing the profiles for similarity.

In some embodiments, the above-described risk formula can be generalized to give users the flexibility to weight different risk factors differently, as follows. Let NS be the total number of services exported by the device; NEIP be the number of external IP addresses that connect to the device; and NIP be the total number of IP addresses that access the server. The devices can then be ranked based on:

$$NS^{w1} \times NEIP^{w2} \times NIP^{w3},$$

for user defined weights $w_1$, $w_2$, and $w_3$, respectively.

In addition, while one or more exemplary embodiments characterize, categorize, cluster, and rank devices using network sessions metadata extracted from packets and network traffic, NetFlow data or endpoint data can also be used with the same degree of success, if available, as would be apparent to a person of ordinary skill in the art.

One or more exemplary algorithms described above are unsupervised and use the data alone to perform device categorization, clustering, and ranking. If additional information is available from CMDB or IRM (Integrated Risk Management) tools about the category assigned to a given device, then this information can be combined with the above-described approaches. For example, the name given to a device can be suppressed, and the name assigned by a human, CMDB or IRM tool can be employed, and can be inherited by the respective cluster (as well as, optionally, all other devices with a similar profile). More generally, any available supervision and other knowledge, for example, from an analyst, CMDB, or IRM tool, can be consumed by the disclosed techniques for clustering, categorization, and/or characterization of devices.

In the exemplary categorization (local fraction) approach described above, the number of distinct IP addresses is used as the primary network metric component. However, another network metric can be employed, such as the total amount of data transferred or the total amount of data uploaded and/or downloaded can also be employed, or a combination of some or all of these factors (e.g., distinct IP addresses; upload bytes; and/or download bytes). Note that, while the number of distinct IP addresses is indicative of an importance of a server (especially, for infrastructure services such as LDAP servers), in other cases the total bytes (or an amount of bytes for upload/download) might be more reasonable for other servers, such as FTP and/or SSH servers.

Exemplary Use Cases

In some embodiments, the disclosed techniques for clustering, categorization, and characterization of enterprise devices can be used to increase device visibility and to improve device detection based on a passive device discovery and characterization. For example, some enterprises may not have CMDBs or have multiple instances which are not trusted, nor frequently updated. Thus, the disclosed device discovery techniques can provide important information (e.g., in the activity-based network profiles 144) about the various devices within an organization.

One or more aspects of the disclosure recognize that an understanding of the available devices and the profiles of such devices can help drive the detection mechanisms that should be in place on the enterprise platform, for example. Instead of leveraging only the knowledge of what administrators and/or analysts think, the information collected with the disclosed passive device discovery techniques to reveal the actual network traffic can aid in automatically enabling and/or suggesting the content that should be enabled for better detection. For example, if web servers are observed in the environment, the disclosed techniques can automatically enable content related to web shells, XSS (cross-site scripting) injection attacks, and other potentially malicious events related to web servers.

In some embodiments, the disclosed techniques for clustering, categorization, and characterization of devices enable one or more of: detecting profile deviations and/or changes; detecting load changes; prioritizing incidents; shadow IT discovery (e.g., determine if a footprint of a customer environment has increased without their knowledge; it could be a benign system that an internal employee instantiated to do their job or a malicious virtual machine that an adversary used to pretend to be part of a test subnet while transferring proprietary and/or personal information out of the enterprise environment); identifying contextual information about devices and their applications; and/or contextual information for network security monitoring.

In further embodiments, the disclosed techniques for clustering, categorization, and characterization of devices can be employed for digital risk management of enterprise devices; application discovery and/or device profile risk assessment applications.

Among other benefits, the disclosed device evaluation techniques allow an analyst to prioritize investigations of device, such as identifying a given device as critical if the given device is similar to a known critical device or a believed-to-be critical device. In this manner, devices can be characterized based on group membership (such as by comparison to other devices in the same cluster).

One or more aspects of the disclosure recognize that a cybersecurity threat analyst often aims to detect security incidents. One common problem for them is where to start the investigation. The disclosed device evaluation techniques allow an analyst to start with the most important devices. The disclosed device evaluation techniques group devices based on their actual profiles, thus providing investigators with a semi-structured representation and categorization of the devices in the enterprise.

Enterprises will often have a very large number of devices. A structured hierarchical view of the devices and context about them, as provided by one or more embodiments of the disclosed techniques for clustering, categorization, and characterization of devices, can be useful for investigation or to understand the relationship addresses between them. Visualization of the relationship addresses and similarities between devices, from a functional perspective, can be revealed by presenting the clustering of devices based on their activity-based network profiles 144, and ranking the devices within the context of a cluster that each device belongs to.

The disclosed techniques also allow a digital risk to be assessed, and optionally provide a reporting of dynamic and up-to-date accurate information about devices and their activities into IRM tools and CMDB tools.

Identifying the devices that exist in a given environment is as valuable for the administrators and the creators of content (e.g., rules, feeds, and parsers) as it is for the analysts. By capturing the devices seen in network communications, profiling them, and categorizing them using the disclosed device evaluation techniques they can be automatically entered or suggested as objects when creating content, saving the administrators time from entering such information manually.

In addition, the activity-based network profiles 144 of devices based on actual network activity is important for risk evaluation and analysis, audit scheduling, and security controls planning and provide a useful tool during investigation and prioritization of security incidents, for example. For a risk analyst, for example, the availability of dynamic and accurate activity-based profiles provides an important data point for risk analysis and management, and prioritization of vulnerability patches, thereby ensuring sufficient and proper security controls are enabled; and appropriate audit schedules are in place.

In an exemplary implementation to mitigate network exposure using a network risk-based ranking, for example, upon detection of a potential risk, a service provider can optionally initiate or execute one or more predefined remedial steps and/or mitigation steps to address the detected potential risk (or other anomalies, for example). For example, the predefined remedial steps and/or mitigation steps to address the detected potential risk may comprise the transmission of an alert or alarm to the user device and/or user for important or suspicious events; isolating, removing, quarantining, limiting permissions, analyzing, and deactivating one or more of the user devices and/or one or more files, accounts or aspects of the user devices or the user; notifying one or more third party systems (such as sending an email, or generating an alert in another system); restricting access of one or more accounts and/or one or more devices from accessing a network, files or folders; initiating a step-up authentication with one or more additional authentication factors; resetting or limiting permissions associated with a file or folder; quarantining one or more files or folders, and preventing (or otherwise limiting) one or more further actions from being executed associated with a user device, user account or machine associated with the detected anomalous activity.

One or more embodiments of the disclosure provide improved methods, apparatus and computer program products for clustering, categorization, and characterization of devices. The foregoing applications and associated embodiments should be considered as illustrative only, and numerous other embodiments can be configured using the techniques disclosed herein, in a wide variety of different applications.

It should also be understood that the disclosed device evaluation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for clustering, categorization, and characterization of devices may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based device evaluation engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based device evaluation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 8:
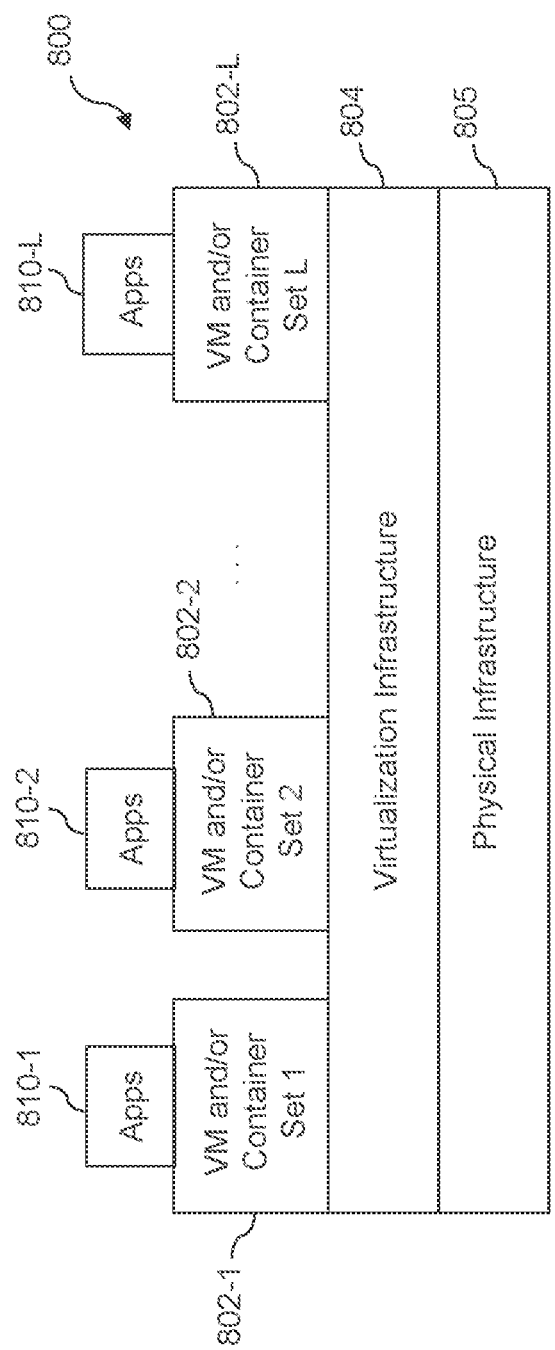
FIG. 8 illustrates an exemplary processing platform that may be used to implement at least a portion of one or more embodiments of the disclosure comprising a cloud infrastructure.

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. Such implementations can provide device evaluation functionality of the type described above for one or more processes running on a given one of the VMs. For example, each of the VMs can implement device evaluation control logic and maintain associated device evaluation data structures for generating network profiles for enterprise devices, and for ranking such enterprise devices using the network profiles, for one or more processes running on that particular VM.

An example of a hypervisor platform that may be used to implement a hypervisor within the virtualization infrastructure 804 is the VMware® vSphere® which may have an associated virtual infrastructure management system such as the VMware® vCenter™. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system. Such implementations can provide device evaluation functionality of the type described above for one or more processes running on different ones of the containers. For example, a container host device supporting multiple containers of one or more container sets can implement one or more instances of device evaluation control logic and maintain associated device evaluation data structures for use in generating activity-based network profiles 144 and for clustering and ranking devices using such profiles.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises at least a portion of the given system and includes a plurality of processing devices, denoted 902-1, 902-2, 902-3, . . . 902-K, which communicate with one another over a network 904. The network 904 may comprise any type of network, such as a WAN, a LAN, a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an ASIC, a FPGA or other type of processing circuitry, as well as portions or combinations of such circuitry elements, and the memory 912, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Figure 9:
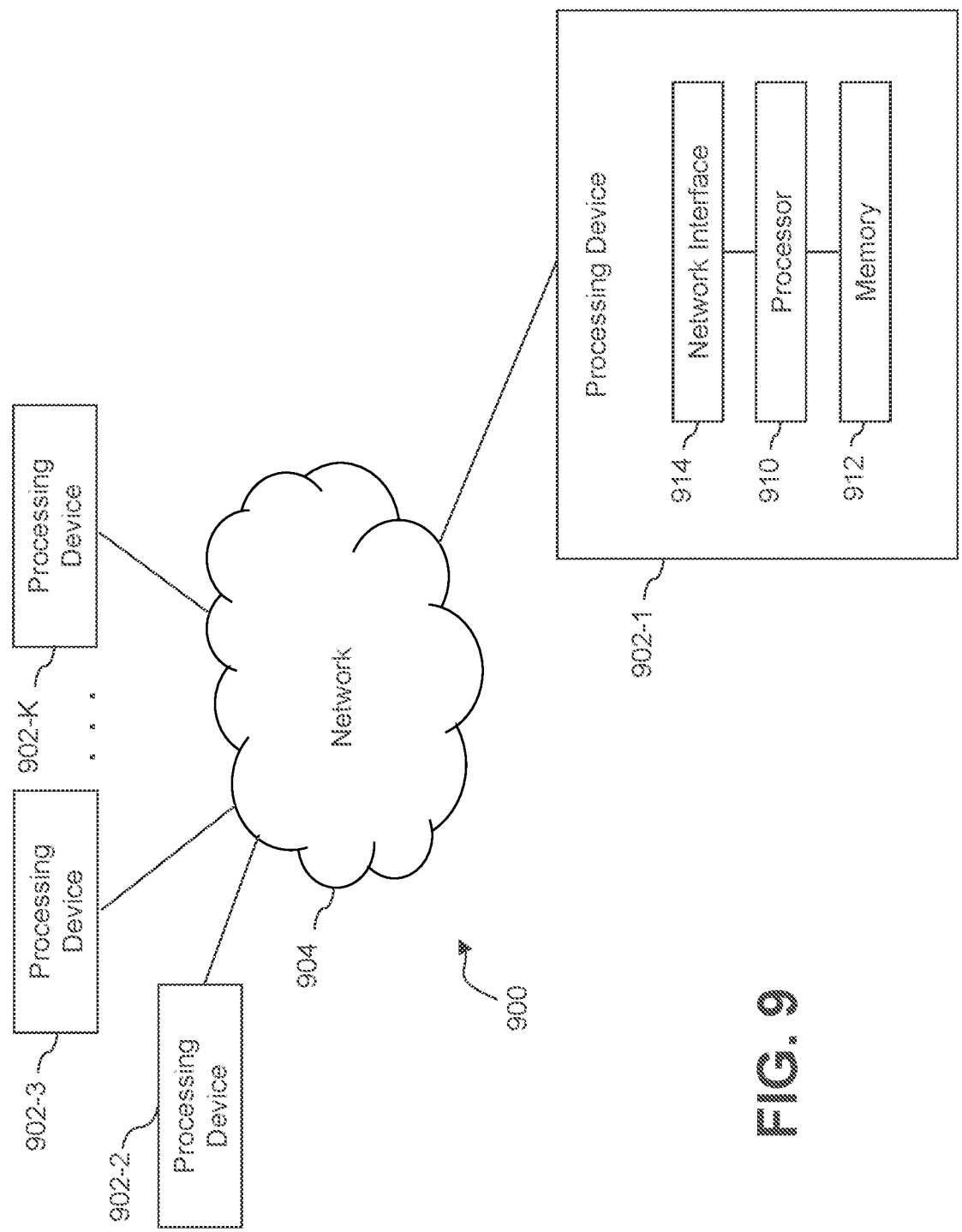
FIG. 9 illustrates another exemplary processing platform that may be used to implement at least a portion of one or more embodiments of the disclosure.

Multiple elements of an information processing system may be collectively implemented on a common processing platform of the type shown in FIG. 8 or 9, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
   identifying device communications over at least one network of an enterprise;
   evaluating the device communications to identify one or more services that communicated with, using the at least one network, a plurality of devices of the enterprise connected to the at least one network;
   generating an activity-based network profile for each device of the plurality of devices based at least in part on the identified one or more services that communicated with each respective device of the plurality of devices, wherein the activity-based network profile for a given device of the plurality of devices: (i) identifies the one or more services that communicated with the given device for each service that communicated with the given device, (ii) identifies other devices of the plurality of devices that communicate with a respective service on the given device, and (iii) provides a local fraction metric based at least in part on one or more network metrics of the other devices of the plurality of devices that communicate with the respective service on the given device;
   clustering the devices into a plurality of clusters based at least in part on a functional characterization of the devices derived from the activity-based network profiles;
   ranking the devices within one or more clusters based on a usage ranking factor, wherein the usage ranking factor is based on a number of distinct IP addresses that access a service that defines a main function of the one or more clusters;
   ranking the devices within one or more clusters based on risk factors of:
      a total number of services exported; and
      a total number of IP addresses that access the network;
   computing a product value of the risk factors and the usage ranking factor; and
   generating an ordered rank of the devices from high to low product value, such that the rank of the devices is ordered from high risk to low risk, wherein the method is performed by at least one processing device comprising a processor coupled to a memory.

2. The method of claim 1, wherein the activity-based network profile for the given device further identifies a device type of the given device and wherein the clustering is further based on the device type such that a plurality of devices having one or more of a substantially similar functional characterization and a substantially similar device type are grouped together, wherein the functional characterization assigns the device type to each device.

3. The method of claim 1, wherein the activity-based network profile for the given device further identifies, for each accessed service, (i) other devices that connect to the respective accessed service on the given device, and (ii) a local fraction metric based at least in part on a ratio of one or more network metrics of communications of other devices that accessed the respective accessed service on the given device to the one or more network metrics of communications of other devices that accessed any service on the given device.

4. The method of claim 1, further comprising:
computing a centroid for each of the plurality of clusters;
receiving a search request for the devices in the plurality of devices similar to a specified device;
comparing the specified device to the computed centroids for the plurality of clusters; and
returning the devices in the clusters having centroids similar to the specified device.

5. The method of claim 1, wherein the activity-based network profile for the given device further identifies, for each service accessed by the given device, (i) other devices where the given device accessed the respective service accessed by the given device, and (ii) a local fraction metric based at least in part on a ratio of one or more network metrics of communications of the given device with the respective service accessed by the given device to the one or more network metrics of communications with any service accessed by the given device.

6. The method of claim 1, wherein the functional characterization is further derived from one or more of the activity-based profile, the local fraction metric, a threshold value for a minimum number of network addresses that communicated with the given device, and a threshold value for the ratio of the number of services communicating with the given device, and a threshold for the ratio between the number of services and the number of network addresses communicating with the device.

7. The method of claim 1, wherein the ranking the devices within each cluster based at least in part on the network activity orders the devices assigned to a given cluster based at least in part on one or more network metrics of devices that communicated with only the services related to a main function of the given cluster.

8. The method of claim 1, wherein the ranking the devices within each cluster based at least in part on the network exposure orders the devices assigned to a given cluster based at least in part on one or more of a total number of distinct services communicating with the given device, a number of network addresses external to the at least one network of the enterprise that communicated with each given device, and a total number of network addresses that communicated with each given device.

9. The method of claim 1, further comprising assigning devices that do not demonstrate a functional characterization to a cluster using a divide and conquer clustering algorithm to form groupings based at least in part on one or more of a profile-similarity, a network proximity, and a device address proximity, wherein the divide and conquer clustering algorithm evaluates, for the given device, one or more of a set of services communicating with the given device, a total number of network addresses communicating with the given device and a network address of the given device.

10. The method of claim 1, wherein the activity-based network profile for the given device is based at least in part on one or more network metrics comprising one or more of a number of distinct network addresses, a total amount of data transferred, a total amount of data uploaded, a total amount of data downloaded and a duration of communication.

11. The method of claim 1, wherein the functional characterization of the given device is provided by a subject matter expert, and wherein at least one additional device that satisfies at least one similarity criteria is assigned to the same cluster as the given device.

12. The method of claim 1, wherein the activity-based network profile for the given device of the plurality of devices is generated by associating, with each device of the plurality of devices, a numeric feature vector that represents quantitative information about services the device exports and imports.

13. The method of claim 1, wherein the identifying is passive with respect to the devices connected to the at least one network.

14. The method of claim 1, further comprising evaluating the device communications to identify one or more previously unknown devices or a deviation of the given device from an original profile.

15. The method of claim 1, further comprising generating content or contextual details for at least one of the plurality of devices based at least in part on one or more of: (a) the activity-based network profile for each of the plurality of devices, (b) the devices within at least one cluster, and (c) the ranking of the devices within at least one cluster.

16. The method of claim 1, wherein the identifying device communications comprises processing one or more of network traffic on the at least one network and log entries for one or more of the devices connected to the at least one network.

17. An apparatus comprising: at least one processing device comprising a processor coupled to a memory;
the at least one processing device being configured to implement the following steps: identifying device communications over at least one network of an enterprise;
evaluating the device communications to identify one or more services that communicated with, using the at least one network, a plurality of devices of the enterprise connected to the at least one network;
generating an activity-based network profile for each device of the plurality of devices based at least in part on the identified one or more services that communicated with each respective device of the plurality of devices, wherein the activity-based network profile for a given device of the plurality of devices: (i) identifies the one or more services that communicated with the given device for each service that communicated with the given device, (ii) identifies other devices of the plurality of devices that communicate with a respective service on the given device, and (iii) provides a local fraction metric based at least in part on one or more network metrics of the other devices of the plurality of devices that communicate with the respective service on the given device;
clustering the devices into a plurality of clusters based at least in part on a functional characterization of the devices derived from the activity-based network profiles;
ranking the devices within one or more clusters based on a usage ranking factor, wherein the usage ranking factor is based on a number of distinct IP addresses that access a service that defines a main function of the one or more clusters;
ranking the devices within one or more clusters based on factors of:
a number of external IP addresses that access each device; and
a total number of IP addresses that access the network;
computing a product value of the risk factors and the usage ranking factors; and generating an ordered rank of the devices from high to low product value, such that the rank of the devices is ordered from high risk to low risk.

18. The apparatus of claim 17, wherein the activity-based network profile for the given device further identifies a device type of the given device and wherein the clustering is further based on the device type such that a plurality of devices having one or more of a substantially similar functional characterization and a substantially similar device type are grouped together, wherein the functional characterization assigns the device type to each device.

19. A non-transitory processor-readable storage medium having stored therein program code of one or more software programs, wherein the program code when executed by at least one processing device causes the at least one processing device to perform the following steps:

identifying device communications over at least one network of an enterprise;

evaluating the device communications to identify one or more services that communicated with, using the at least one network, a plurality of devices of the enterprise connected to the at least one network;

generating an activity-based network profile for each device of the plurality of devices based at least in part on the identified one or more services that communicated with each respective device of the plurality of devices, wherein the activity-based network profile for a given device of the plurality of devices: (i) identifies the one or more services that communicated with the given device for each service that communicated with the given device, (ii) identifies other devices of the plurality of devices that communicate with a respective service on the given device, and (iii) provides a local fraction metric based at least in part on one or more network metrics of the other devices of the plurality of devices that communicate with the respective service on the given device;

clustering the devices into a plurality of clusters based at least in part on a functional characterization of the devices derived from the activity-based network profiles;

ranking the devices within one or more clusters based on a usage ranking factor, wherein the usage ranking factor is based on a number of distinct IP addresses that access a service that defines a main function of the one or more clusters;

ranking the devices within one or more clusters based on risk factors of:

a total number of services exported; and a total number of IP addresses that access the network;

computing a product of the risk factors and the usage ranking factor; and generating an ordered rank of the devices from high to low product value, such that the rank of the devices is ordered from high risk to low risk.

20. The non-transitory processor-readable storage medium of claim 19, wherein the activity-based network profile for the given device further identifies a device type of the given device and wherein the clustering is further based on the device type such that a plurality of devices having one or more of a substantially similar functional characterization and a substantially similar device type are grouped together, wherein the functional characterization assigns the device type to each device.

* * * * *

UNITED STATES PATENT AND TRADEMARK OFFICE
CERTIFICATE OF CORRECTION

| | |
|---|---|
| PATENT NO. | : 11,368,545 B2 |
| APPLICATION NO. | : 16/778123 |
| DATED | : June 21, 2022 |
| INVENTOR(S) | : Davis et al. |

It is certified that error appears in the above-identified patent and that said Letters Patent is hereby corrected as shown below:

In the Claims

• In Claim 17, Line 63, delete "a number of external IP addresses that access each device" and replace it with --a total number of services exported--.

Signed and Sealed this
Twenty-first Day of March, 2023

Katherine Kelly Vidal
*Director of the United States Patent and Trademark Office*